US008907553B2

United States Patent
Sharifi et al.

(10) Patent No.: US 8,907,553 B2
(45) Date of Patent: Dec. 9, 2014

(54) COLD FIELD ELECTRON EMITTERS BASED ON SILICON CARBIDE STRUCTURES

(75) Inventors: Fred Sharifi, Poolesville, MD (US); Myung-Gyu Kang, Gaithersburg, MD (US); Henri Lezec, Bethesda, MD (US)

(73) Assignee: The United States of America as represented by the Secretary of Commerce, The National Institute of Standards and Technology, Washington, DC (US)

( * ) Notice: Subject to any disclaimer, the term of this patent is extended or adjusted under 35 U.S.C. 154(b) by 0 days.

(21) Appl. No.: 13/569,245

(22) Filed: Aug. 8, 2012

(65) Prior Publication Data

US 2013/0187532 A1 Jul. 25, 2013

Related U.S. Application Data

(60) Provisional application No. 61/589,954, filed on Jan. 24, 2012.

(51) Int. Cl.
*H01J 9/02* (2006.01)
*H01J 1/00* (2006.01)
*H01J 1/304* (2006.01)

(52) U.S. Cl.
CPC ..................................... *H01J 1/304* (2013.01)
USPC ........... 313/310; 313/311; 313/312; 313/313; 313/315

(58) Field of Classification Search
None
See application file for complete search history.

(56) References Cited

U.S. PATENT DOCUMENTS

| | | |
|---|---|---|
| 5,556,530 A | 9/1996 | Finkelstein et al. |
| 5,804,910 A | 9/1998 | Tjaden et al. |
| 6,201,342 B1 | 3/2001 | Hobart et al. |
| 6,340,425 B2 | 1/2002 | Ito |
| 6,781,294 B2 | 8/2004 | Sakai et al. |
| 7,109,515 B2 | 9/2006 | Merkulov et al. |
| 7,879,308 B1 | 2/2011 | Chow et al. |
| 7,902,736 B2 | 3/2011 | Hudspeth et al. |

OTHER PUBLICATIONS

G.N. Fursey, "Field emission in vacuum micro-electronics"; Applied Surface Science 215 (2003) 113-134.
Takao Utsumi, Keynote Address Vacuum Microelectronics: What's New and Exciting, IEEE Transactions on Electron Devices, vol. 38, No. 10, Oct. 1991.
David R. Whaley, Bartley M. Gannon, Carl R. Smith, Carter M. Strmstrong and Capp A. Spindt, "Application of Field Emitter Arrays to Microwave Power Amplifiers," IEEE Transactions on Plasma Science, vol. 28, No. 3, Jun. 2000.
P.R. Schwoebel, "Field emission arrays for medical x-ray imaging," Applied Physics Letters 88, 113902 (2006).
Sung Hwan Heo, Aamir Ihsan and Sung Oh Cho, "Transmission-type microfocus x-ray tube using carbon nanotube field emitters," Applied Physics Letters 90, 183109 (2007).

(Continued)

*Primary Examiner* — Natalie Walford
(74) *Attorney, Agent, or Firm* — Mark E. Bandy; Rankin, Hill & Clark LLP

(57) ABSTRACT

A cold cathode field emission electron source capable of emission at levels comparable to thermal sources is described. Emission in excess of 6 A/cm² at 7.5 V/µm is demonstrated in a macroscopic emitter array. The emitter is comprised of a monolithic and rigid porous semiconductor nanostructure with uniformly distributed emission sites, and is fabricated through a room temperature process which allows for control of emission properties. These electron sources can be used in a wide range of applications, including microwave electronics and x-ray imaging for medicine and security.

6 Claims, 5 Drawing Sheets

(56) References Cited

OTHER PUBLICATIONS

G.Z. Yue, Q. Qiu and Bo Gao, Y. Cheng, J. Zhang, H. Shimoda, S. Chang, J.P. Lu, and O. Zhou, "Generation of continuous and pulsed diagnostic imaging x-ray radiation using a carbon-nanotube-based field-emission cathode," Applied Physics Letters, vol. 81, No. 2, Jul. 8, 2002, 355-357.

A.A. Talin, K.A. Dean, and J.E. Jaskie, "Field emission displays: a critical review," Solid-State Electronics 45 (2001) 963-976.

K. Li, R. Ganter, J., zzzY. Raguin, M. Dehler, J. Gobrecht, L. Rivkin, A. Wrulich, "Field Emitter Arrays for a Free Electron Laser Application," Proceedings of the 2004 FEL Conference, 606-609.

C.A. Spindt, "A ThinFilm FieldEmission Cathode," AIP, Journal of Applied Physics, 39, 3504 (1968).

C.A. Spindt, E. Holland, A. Rosengreen and Ivor Brodie, "Field-Emitter Arrays for Vacuum Microelectronics," IEEE Transactions on Electron Devices, vol. 38. No. 10, Oct. 1991.

John A. Nation, Levi Schachter, Frederick M. Mako, L.K. Len, William Peter, Cha-Mei Tang and Triveni Srinivasan-Rao, "Advances in Cold Cathode Physics and Technology," Proceedings of the IEEE, vol. 87, No. 5, May 1999.

L. Gangloff, E. Minoux, K.B. K. Teo, P. Vincent, V.T. Semet, V.T. Bihh, M.H. Yang, I. Y. Y. Bu, R.G. Lacerda, G. Pirio, J.P. Schnell, D. Pribat, D.G. Hasko, G.A.J. Amaratunga, W.I. Milne, and P. Legagneux, "Self-Aligned, Gated Arrays of Individual Nanotube and Nanowire Emitters," Nano Letters, 2004, vol. 4, No. 9, 1575-1579.

Seu Yi Li, Chia Ying Lee, Pang Lin, Tseung Uyen Tseng, "Gate-controlled ZnO nanowires for field-emission device application," J. Vac. Sci. Etchnol. B 24(1), Jan./Feb. 2006.

Hyung Soo Uh, Sang Jik Kwon, Jong Duk Lee, "Process design and emission properties of gated n+ polycrystalline silicon field emitter arrrays for flat-panel display applications," J. Vac. Sci. Technol. B 15(2), Mar./Apr. 1997.

Walt A. de Heer, A. Chatelain, D. Ugarte, "A Carbon Nanotube Field-Emission Electron Source," Science, Vo. 270, Nov. 17, 1995.

Otto Zhou, Hideo Shimoda, Bo Gao, Soojin Oh; Les Fleming, and Guozhen Yue, "Materials Science of Carbon Nanotubes: Fabrication, Integration, and Properties of Macroscopic Structures of Carbon Nanotubes," Accounts of Chemical Research, vol. 35, No. 12, 2002.

Jean-Marc Bonard, Hannes Kind, Thomas Stockli, Lars-Ola Nilsson, "Field emission from carbon nanotubes: the first five years," Solid-State Electronics 45 (2001) 893-914.

W. I. Milne, K.B.K. Teo, M. Mann, I.Y.Y. Bu, G.A. J. Amaratunga, N. DeJonge, M. Allioux, J.T. Oostveen, P. Legagneux, E. Minoux, L. Gangloff, L. Hudanski, J.P. Schnell, L.D. Dieumegard, F. Peuger, T. Wells and M. El-Gomati, "Carbon nanotubes as electron sources," phys. stat. sol. (a) 203, No. 6, 1058-1063 (2006).

Eric Minoux, Oliver Groening, Kenneth B.K. Teo, Sharvari H. Dalal, Laurent Gangloff, Jean-Phillipe Schnell, Ludovic Hudanski, Ian Y. Y. Bu, Pascal Vincent, Pierre Legagneux, Gehan A. J. Amaratunga and William I. Milne, "Achieving High-Current Carbon Nanotube Emitters," Nano Letters, 2005, vol. 5, No. 11, 2135-2138.

Xiomara Calderon-Colon, Huaizhi Geng, Bo Gao, Lei An, Guohua Cao and Otto Zhou, "A carbon nanotube field emission cathode with high current density and long-term stability," Nanotechnology 20 (2009).

D. Shiffler, O. Zhous, C. Bower, M. LaCour, and K. Golby, "A High-Current, Large-Area, Carbon Nanotube Cathode," IEEE Transactions on Plasma Science, vol. 32, No. 5, Oct. 2004.

Y. Ke, R.P. Devaty, and W.J. Choyke, "Comparative columnar porous etching studies on n-type 6H SiC crystalline faces," Phys. stat.sol. (b) 245, No. 7, 1396-1403 (2008).

Y. Ke, R. P. Devaty, and W. J. Choyke, "Self-Ordered Nanocolumnar Pore Formation in the Photoelectrochemical Etching of 6H SiC," Elecrochemical and Solid-State Letters, 10 (7) K24-K27 (2007).

Y. Ke, Y. Shishkin, R.P. Devaty and W.J. Choyke, "Porous SiC Preparation, Characterization and Morphology," Porous Silicon Carbide and Gallium Nitride: Epitaxy, Catalysis, and Biotechnology Applications, Feb. 6, 2008, p. 1-29.

Y. Ke, C. Moisson, S. Gaan, R.M. Geenstra, R.P. Devaty and W.J. Choyke, "A Comparison of Various Surface Finishes and the Effects on the Early Stages of Pore Formation During High Field Etching of SiC," (no date)

COLD FIELD ELECTRON EMITTERS BASED ON SILICON CARBIDE STRUCTURES

CROSS REFERENCES TO RELATED APPLICATIONS

This application claims priority upon U.S. provisional application Ser. No. 61/589,954 filed on Jan. 24, 2012.

STATEMENT AS TO RIGHTS TO INVENTION(S) MADE UNDER FEDERALLY-SPONSORED RESEARCH AND DEVELOPMENT

The US Government, through the National Institute of Standards and Technology, is the owner of this invention.

FIELD

The present subject matter relates to a monolithic and porous silicon carbide field electron emitter, and particularly a cold field electron emitter, and related methods of forming.

BACKGROUND

Cold field electron emitters or "cold cathode" electron sources based on field emission have been continuously researched for decades, with resurgence in recent years motivated by advances in carbon nanostructures. This research is motivated by the significant technological applications enabled by the desirable properties of field-extracted cold electrons in comparison to heat induced electron emissions. The use of carbon nanotube field emitters in display applications and its potential advantages have been known for some time. In addition though, attributes such as minimal beam spread and fast response would also allow for advances in other critical applications, including microwave electronics and x-ray sources. These attributes would lead to superior communication and radar, and new functionalities and modalities in imaging technology for medicine and security. These latter applications, however, require an emitter capable of high emission current, which so far has been in the realm of thermal sources.

Accordingly, a need exists for a cold field or "cold cathode" field emitter which could provide relatively high emission current densities without failure. Moreover, it would also be beneficial to provide methods of forming such emitters at ambient temperatures and which are amenable for large scale manufacturing processes.

SUMMARY

The difficulties and drawbacks associated with previously known technologies are addressed in the present products and methods for a silicon carbide cold field emitter.

In one aspect, the present subject matter provides a method of forming a monolithic, homogeneous, and porous silicon carbide field emitter having a plurality of discrete emission projections extending from a face of the field emitter. The method comprises providing a silicon carbide substrate of any poly-type. The method also comprises providing an anodizing solution including (i) at least one reducing agent, (ii) at least one oxidizer, and (iii) water. The method additionally comprises electrochemically etching a face of the silicon carbide substrate with the anodizing solution for an effective period of time to thereby form an etched silicon carbide substrate that is porous and maintains structural integrity. And, the method further comprises subjecting the face of the porous silicon carbide substrate to ion etching to thereby form a silicon carbide field emitter having a shaped macroscopic surface, in the form of fins, pillars, or other structures, whereby the shaped surface leads to increased emission through additional field enhancement. The shaped surfaces have a plurality of discrete emission projections extending from the face of the field emitter.

In another aspect, the present subject matter provides a porous silicon carbide field emitter having a plurality of discrete emission projections extending from an emission face of the field emitter. The field emitter is monolithic and homogenous in a direction transverse to the emission face of the field emitter.

In still another aspect, the present subject matter provides a cold cathode silicon carbide field emitter that defines an emission face having a collection of discrete emission projections. The field emitter achieves an emission current density greater than 6 A/cm$^2$ at an applied macroscopic electric field of 7.5 V/μm.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

The present subject matter is based upon a new form of field electron emitter, and particularly a cold field emitter, comprised of nanoporous silicon carbide (SiC) and fabricated using a wafer-based process. The resulting monolithic and porous silicon carbide surface emitters exhibit remarkable performance characteristics. Unlike previously known emitters, the present subject matter structure is free of nanostructured tubes or rods, and in contrast, is a rigid and homogenous porous structure. Significantly, the present subject matter emitters are capable of stable emission at macroscopic current densities comparable to thermal sources, allowing for their implementation in applications which require high emission current. Their emission properties are controlled by geometric enhancement of the electric field set by a two-level hierarchy of morphology: a local nanostructure and a larger scale global structure manifested through dimensionality. The combination of the intrinsic material properties and ability to control morphology at the two noted levels of hierarchy allows for optimization of critical parameters including emission, required field, and lifetime.

In contrast to thermionic emission in which electrons are released through heat, field emission extracts electrons using an applied electric field through quantum mechanical tunneling. In field emitters, electron emission is described by the Fowler-Nordheim model in which the tunneling barrier is distorted by a large electric field. Here, the emission current density is expressed by equation (I):

$$J \propto (\beta E)^2 e^{-\phi^{1.5}/(\beta E)} \qquad (I)$$

in which the emission current per unit area is exponentially dependent on the emitter's work function $\phi$, the applied electric field E, and the field enhancement factor $\beta$. For arrays of emitters, $\beta$ is defined by a two level hierarchy: 1) local electric field enhancement at the level of the individual emitting structure, determined by the size and shape of the local nanostructure, and 2) the global electric field enhancement, set by the larger scale spatial arrangement of the emitters comprising the array.

Figure 1:
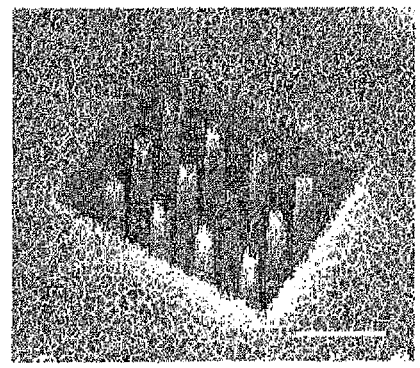
FIG. 1 is a scanning electron microscopy (SEM) image of a porous silicon carbide substrate having a plurality of pillar projections, in accordance with the present subject matter.
Figure 2:
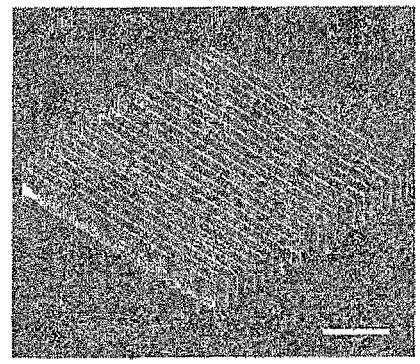
FIG. 2 is a SEM image of a porous silicon carbide substrate having a plurality of fin projections, in accordance with the present subject matter.
Figure 3:
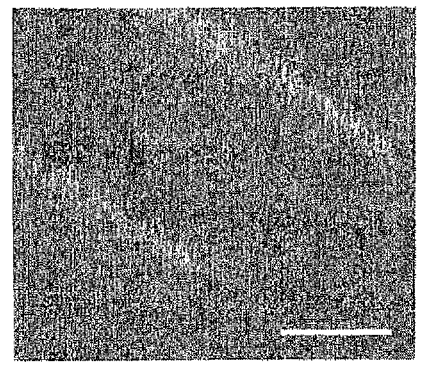
FIG. 3 is a SEM image of the fin projections of FIG. 2 at a greater magnification.

In accordance with the present subject matter, the fabrication process of these new emitters allows for control of this two-level field enhancement hierarchy and the ability to tune emitter characteristics. The emitters are fabricated from silicon carbide wafers. The wafers are electrochemically etched into a monolithic nanoporous structure and subsequently further processed by ion etching, while maintaining morphology and porosity, as illustrated in FIGS. 1-3. Specifically, FIGS. 1-3 are scanning electron microscopy (SEM) images of porous silicon carbide substrates demonstrating the two-level hierarchy set by local nanostructure and macroscopic morphology. In FIG. 1, pillars extending from a face of the silicon carbide substrate are shown relative to a scale bar of 10 μm. In FIG. 2, fins extending from a face of the silicon carbide substrate are shown relative to a scale bar of 50 μm. In FIG. 3, a magnified view of the fin projections of FIG. 2 are shown relative to a scale bar of 4 μm. At the first level of hierarchy, field enhancement is defined by the shape of the local nanostructure, and varied through electrochemistry conditions to alter relevant features such as porosity and wall thickness. At the second level, the macroscopic shape of the structure controls the global field enhancement across the emitting area.

The starting material, silicon carbide, is chosen as it is refractory and capable of withstanding high current densities. In addition, silicon carbide possesses a wide electronic bandgap, and may be n-doped. This property leads to an enhanced tunneling probability and thus increased emission, by reducing the effective work function or electron affinity. A silicon carbide substrate of any poly-type can be used. It will be appreciated that other starting materials could potentially be used, such as for example gallium nitride. However, in no way is the present subject matter limited to silicon carbide or gallium nitride.

Additional details and aspects of the methods and field emitters of the present subject matter are as follows.

Methods

The methods of the present subject matter employ electrochemical etching, or "electroetching" or "anodization", to form a porous and specifically, a nanoporous structure, in the silicon carbide substrate. Then, after formation of the porous matrix within the substrate and at least along one or more face regions of the substrate, the porous substrate is subjected to one or more operations to form a plurality of discrete emission projections extending from the face region(s) of the substrate. The discrete emission projections can be in a variety of different forms such as but not limited to pillars, fins, columns, "knife" like rows, or other shapes and configurations.

The electrochemical etching can be performed in a variety of different techniques and using various equipment and configurations. Generally, the silicon carbide substrate to be electrochemically etched is placed in electrical connection to a positive electrode or pole of a source of electrical current, and typically direct electrical current. A negative electrode is also provided and placed in electrical communication with the electrical source. A platinum electrode known in the art can be used as a negative electrode for facilitating electrical connection to the circuit and is immersed in the anodizing solution. The silicon carbide substrate is then immersed in an electrolyte or anodizing solution as described in greater detail herein. A voltage is then applied across the platinum electrode and the silicon carbide sample.

For certain versions of the present method, a voltage of from about 10 V to about 100 V has been found to be useful, with about 20 V being preferred. However, it will be understood that the present subject matter is not limited to any of these particular voltages.

The time period for which electrochemical etching is performed depends upon the desired characteristics of the field emitter such as size, density, and configuration of the pores and voids and the resulting porosity of the silicon carbide substrate. Typical time periods for electrochemical etching are from about 1 minute to about 8 hours, and more typically from about 5 minutes to about 4 hours, with 10 minutes being suitable for many applications. As previously noted, it will be appreciated that the present subject matter methods can be performed for time periods greater than or less than any of the noted time periods. Also, continuous and intermittent etching practices are contemplated. Etching may be performed upon one or more faces, or upon a portion or all surfaces of a silicon carbide substrate.

As silicon carbide is a polar material, there is an internal electric field which results in differences in etch results on the two faces of the wafer. These two faces, referred to as the "Si-face" and the "C-face" are capable of field emission, and the emitter device may be comprised of either face of the wafer. The specific built-in field, characteristic of one or the other face, may have advantages depending on the specific application. As a result one face may have preferential emission properties over the other.

The electrolyte or anodizing solution used in the electrochemical etching generally includes at least one reducing agent, at least one oxidizer, and water which may act as an oxidizer. The agents may work in conjunction with the applied voltage present in the electrochemistry process. The solution may also include one or more additional components or be limited to the three noted components. A wide array of reducing agents can be used in the anodizing solution such as for example acidic reducing agents. A preferred reducing agent is hydrofluoric acid which can be used at a concentration of from about 1% to about 30%, with typical concentrations being 10% or 20%. A wide array of oxidizers can be used in the anodizing solution such as for example one or more alcohols. A preferred oxidizer is ethanol which can be used at a concentration of from about 5% to about 30%, with 5% being preferred for many applications. Other oxidizers may be acid-based such as nitric acid, or other alcohols such as methanol. The anodizing solution also includes water. The water can be deionized water or distilled water for example. For certain applications, deionized water is preferred because deionized water typically contains fewer contaminants. Such contaminants can produce or lead to undesirable by-products during electrochemical etching. Furthermore, deionized water is less electrically conductive than distilled water and tends to produce a more ordered pore structure. When forming field emitters, typically a relatively ordered pore structure is preferred as compared to a more random pore structure.

The electrochemical etching operation(s) can be performed at ambient temperatures, which are generally considered to be within a range of from about 65° F. (18° C.) to about 75° F. (24° C.).

The electrochemical etching operations(s) may be assisted by illumination with incident light of sufficiently large photon energy, so as to promote the anodization process.

Similar electrochemical etching processes are described in Ke, Y., Devaty, R. P. & Choyke, W. J., Comparative Columnar Porous Etching Studies on N-Type 6H SiC Crystalline Faces, *Phys. Stat. Sol.* (b) 245, 1396-1403 (2008); and Ke, Y., Devaty, R. P. & Chjoyke, W. J., Self-Ordered Nanocolumnar Pore Formation in the Photoelectrochemical Etching of 6H SiC. *Electrochem, Solid-State Lett.* 10, K24-K27 (2007).

After subjecting the silicon carbide substrate to electrochemical etching, the substrate is rendered porous, with porosity ranging from 50% to 98%. In certain versions of the present subject matter, the porosity of the substrate can be characterized as nanoporous. The term "nanoporous" as used herein refers to a structure in the silicon carbide substrate that includes numerous pore walls which have a size generally within the nanometer range. Additional details and characteristics of the porous silicon carbide structure are provided herein.

The methods of the present subject matter also include one or more operations for forming the discrete emission projections extending from a face of the porous silicon carbide substrate. The operations preferably include for example, one or more ion etching operations which are performed after the electrochemical etching. Non-limiting examples of ion etching operations include focused ion beam (FIB) etching which may be gas-assisted, and reactive ion etching (RIE). Generally, both of these types of ion etching operations can be performed at room temperature.

Focused ion beam etching is a technique used particularly in the semiconductor industry, materials science and increasingly in the biological field for site-specific analysis, deposition, and ablation of materials. A wide variety of systems for performing focused ion beam etching or milling are known in the art and/or are commercially available.

Reactive ion etching technology is typically used in microfabrication. This technique uses chemically reactive plasma to remove material deposited on a substrate or wafer. A plasma is generated under low pressure (vacuum) by an electromagnetic field. High energy ions from the plasma attack the wafer surface and react with the surface. Similarly, a wide array of reactive ion etching systems are known and are commercially available.

Field Emitters

The silicon carbide field emitters of the present subject matter exhibit certain characteristics as follows. In certain versions, the field emitters include a collection of discrete emission projections such as pillars, fins, or columns, extending from one or more faces or portion(s) of a face. The emission projections typically have an average height within a range of from about 1 micron to about 100 microns, an average thickness of from about 0.01 microns to about 10 microns, and an average spacing of from about 1 micron to about 100 microns. However, it will be understood that the present subject matter includes emitters having emission projections with heights, thicknesses, and/or spacings different than these representative ranges.

The field emitters are relatively porous and typically exhibit an average pore wall thickness of from about 10 nm to about 1,000 nm, and an average pore size of from about 10 nm to about 1,000 nm. Similarly and as noted, the present subject matter includes substrates and emitters having different pore sizes and pore wall thicknesses.

A significant benefit of the present subject matter field emitters is that the field emitters are monolithic and specifically, porous. As the porous structure is fabricated by removal of material, the remaining structure is compositionally homogenous and free of interfaces with other materials, such that the structure provides a continuous supply of emitter material. Thus, the porous, homogenous, and monolithic structure provides emitters which are reliable and exhibit a relatively long lifetime. The field emitters are monolithic and homogenous in a direction transverse to the emission face of the field emitter. This aspect refers to a characteristic of the emitter in which the emitter structure, i.e. between the emission face and an oppositely directed rear face, is free of any other materials or material layers besides silicon carbide. Thus, the emitter structure is free of any material interfaces along or proximate the emission face. And therefore in many versions of the present subject matter, the emitter structure consists entirely of silicon carbide and particularly porous silicon carbide. It will be understood that one or more electrodes or conductive traces may be disposed alongside or upon the rear face of the emitter.

EXAMPLES

Figure 4:
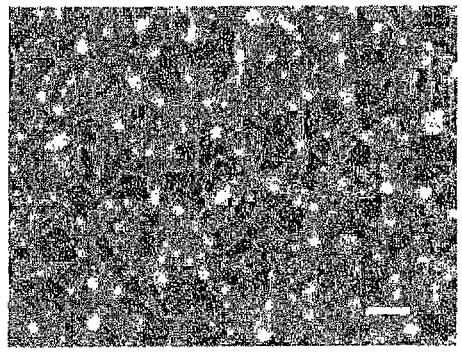
FIG. 4 is a planar view of a SEM image of an electrochemically etched "C-face" of silicon carbide substrate formed using a set of conditions referred to herein as Condition 1.
Figure 5:
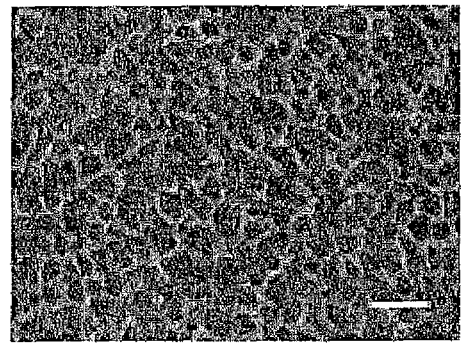
FIG. 5 is a planar view of a SEM image of an electrochemically etched "C-face" of silicon carbide substrate formed using a set of conditions referred to herein as Condition 2.

Silicon carbide wafers (6-H), of n-type doping with nominal resistivity ranging from 0.02 cm to 0.2 cm were etched into a porous nanostructures. A range of electrochemical conditions were explored, and the resulting structures are dependent on the specifics of the anodization chemistry. This difference in nanostructure morphology manifests itself in the emission characteristics, as it leads to different local field enhancement. As an example, FIGS. 4 and 5 demonstrate the variation in structure that result from wafers anodized using electrochemical solutions with different conductivity. In a first set of conditions referred to herein as Condition 1, the aqueous chemistry consisted of an anodizing solution comprised of 10% HF and 5% ethanol (by mass) with the balance distilled water. In a second set of conditions referred to herein as Condition 2, the anodizing solution comprised of 20% HF and 5% ethanol (by mass) with the balance de-ionized water. In both cases, ohmic contacts were made to the silicon-terminated side of the wafer by depositing 50 nm of Ni followed by annealing at 300° C. in Argon. The emitting or carbon-terminated side was subsequently anodized at 20 V using a Pt mesh counter-electrode. Both conditions yielded a nominal anodization rate of 4 μm/min, and porous structures approximately 90 μm in depth were readily produced. Wafers anodized using Condition 2 also had an undesirable dense top layer approximately 2 μm thick with low porosity, which was subsequently removed by reactive ion etching (RIE) using a plasma chemistry consisting of 90% $SF_6$ and 10% $O_2$. As shown in FIG. 4, Condition 1 resulted in structures with wide variations in pore size, and pore wall thicknesses ranging from 30 nm to 200 nm, where the thicker pore walls dominate the structure. In addition, there is an insulating phase which manifests itself as bright spots in the figure. In Condition 2 shown in FIG. 5, more uniform porosity with smaller wall thickness were produced, with typical pore sizes of 150 nm and wall thickness between 20 nm and 30 nm. In FIGS. 4-5, the scale bar is 500 nm.

Performance of these emitters was characterized through testing using a large area diode configuration in a vacuum chamber with a base pressure of $1.3 \times 10^{-7}$ Pa. Testing was typically performed at pressures above $1 \times 10^{-6}$ Pa. The anode and cathode utilized parallel plate geometry and were approximately 1 cm in diameter, with electrode separation typically at 1.000 mm±0.002 mm. The measurements were performed either in continuous (dc) or pulse mode, with pulse widths ranging from 0.2 ms to 10 ms at 1 Hz. The emission results were independent of the testing procedure and pulse testing was primarily performed to reduce heating at the uncooled anode.

Figure 6:
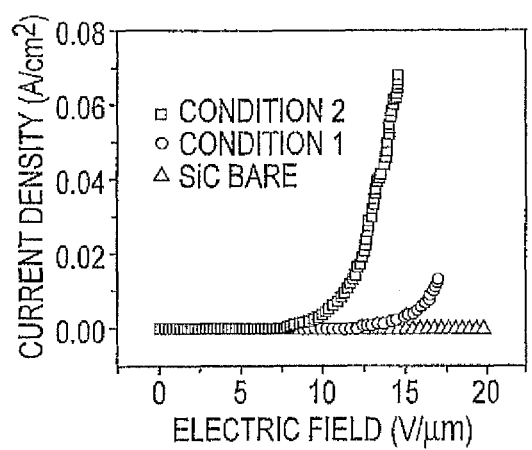
FIG. 6 is a graph of current density versus electric field for the silicon carbide substrates produced using Conditions 1 and 2, and for an unprocessed silicon carbide wafer.
Figure 7:
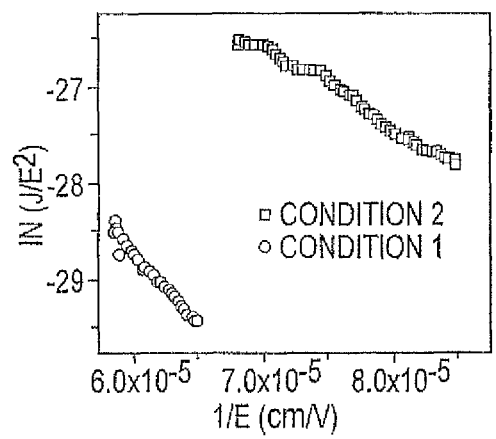
FIG. 7 is a Fowler-Nordheim plot of emission from the silicon carbide substrates produced using Conditions 1 and 2.

The thinner average pore walls of wafers processed through Condition 2 should lead to a higher local field enhancement and thus higher emission. This is indeed observed as shown in FIG. 6, where the emission characteristics corresponding to the etch conditions are plotted. For comparison, testing was also performed on an unprocessed wafer, demonstrating no significant emission. In both cases the emission areas are macroscopic, square-shaped with sides 2 mm in length. Here and in subsequent plots, the uncertainty in electric field is 0.2%, (1σ) and is determined by the uncertainties in the electrode separation and output of the high voltage apparatus. The uncertainty in the emission current is 0.1% (1σ) and is determined by the precision of the current measurement apparatus. In the Fowler-Nordheim plot shown in FIG. 7, β is inversely proportional to the slope, and the flatter line corresponding to Condition 2 indicates an increase in local field enhancement over Condition 1. The exact value of β requires detailed knowledge of the electron affinity or effective work function. For a wide-band gap semiconductor such as silicon carbide, electron affinity effects are significant and yield a reduced work function estimated to range from 3.6 eV to 4.2 eV, where the exact values are dependent on polytype, crystalline orientation, and nanoscale size. Combined, these factors lead to some uncertainty in Fowler-Nordheim analysis, and thus comparison of the field enhancement factors should be viewed qualitatively. With this caveat, the extracted β values for all tested devices are presented in Table 1, below. As shown, the field enhancement in Condition 2 is roughly a factor of two higher than that in Condition 1. These results demonstrate that it is possible to vary the density of emission points and local field enhancement through the electrochemistry conditions.

TABLE 1

Estimated β for Various Values of Work Function

| φ (eV) | Flat Cond. 1 | Flat Cond. 2 | Mesa | Fins | Pillars |
|---|---|---|---|---|---|
| 4.2 | 393 | 732 | 770 | 936 | 1781 |
| 4.0 | 365 | 680 | 716 | 870 | 1656 |
| 3.8 | 338 | 630 | 663 | 806 | 1533 |
| 3.6 | 312 | 580 | 611 | 743 | 1414 |

Figure 8:
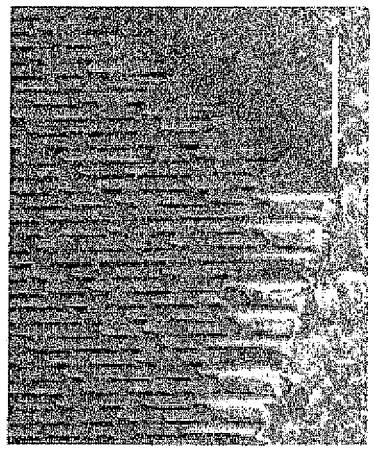
FIG. 8 is a SEM image of a porous silicon carbide substrate having a mesa projection, in accordance with the present subject matter.
Figure 9:
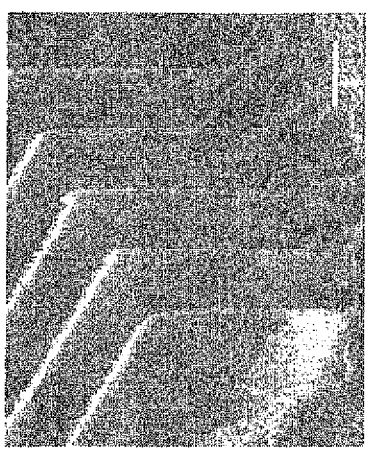
FIG. 9 is a SEM image of a porous silicon carbide substrate having a plurality of fin projections, in accordance with the present subject matter.
Figure 10:
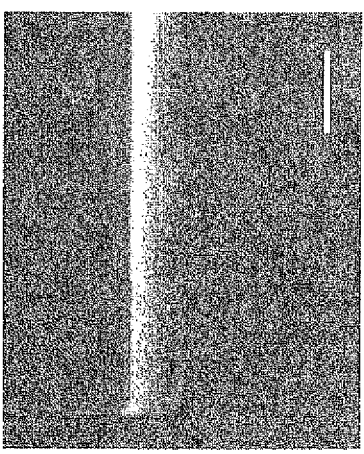
FIG. 10 is a SEM image of a porous silicon carbide substrate having a plurality of pillar projections, in accordance with the present subject matter.

Hierarchy at the second level is demonstrated by fabricating and testing structures with different large scale geometric dimensionality. To this end, the anodized structures initially were plasma-etched (RIE) into macroscopic mesas (2D) and further formed into line (1D) and point emitters (0D) using a high resolution focused ion beam (FIB) through gas-assisted ion etching. The nanostructured wafers anodized through Condition 2 were patterned by FIB etching using a $Ga^+$ ion source operating at 30 keV beam energy and 2.5 nA beam current, assisted by $XeF_2$ gas. The use of gas-assisted etching in shaping these emitter led to a six-fold increase in material removal rate, compared to etch removal without gas assistance. This efficient chemical removal of the silicon carbide in porous form enables straightforward formation of high aspect ratio structures and minimizes the amount of material re-deposited into emitter pores as a result of direct physical sputtering by the beam. This technique was used to fabricate a variety of exploratory structures, and assess the mechanical robustness and the limits of aspect ratio that could be achieved, as shown in FIGS. 1-3. Structures in the form of the un-patterned mesa, and arrays of fins and pillars were fabricated for emission studies and are illustrated in FIGS. 8-10. In these, the line (fins) and point (pillars) structures were formed from a starting macroscopic square mesa as shown in FIG. 8 with a side length more than ten-fold the pitch or the height of the emitter. This relative scaling is important for the measured current density to accurately represent larger sized arrays, and thus be macroscopic. Specifically, FIGS. 8-10 are SEM images of the noted structures. FIG. 8 illustrates a mesa, relative to a scale bar of 50 μm. FIG. 9 illustrates fins, relative to a scale bar of 10 μm. FIG. 10 illustrates pillars, relative to a scale bar of 50 μm. Corresponding J vs. E and F-N plots are provided in the insets of each figure. In FIG. 9, the fins are 1.5 μm wide, 20 μm high, at 10 μm pitch. In FIG. 10, the square pillars are 2 μm per side and 20 μm high, with the same pitch. In all cases, the emitter arrays are squares, 0.21 mm per side. The data was obtained in pulse mode with a 0.2 ms pulse width.

Figure 11:
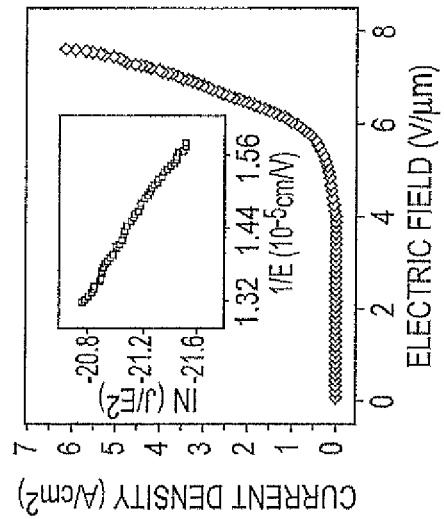
FIG. 11 includes graphs of current density versus electric field and a Fowler-Nordheim plot for the mesa projection of FIG. 8.
Figure 12:
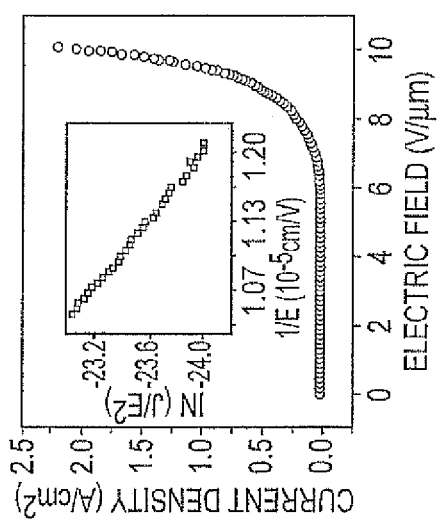
FIG. 12 includes graphs of current density versus electric field and a Fowler-Nordheim plot for the fin projections of FIG. 9.
Figure 13:
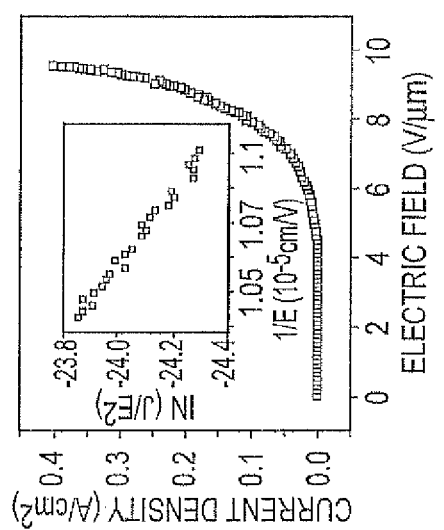
FIG. 13 includes graphs of current density versus electric field and a Fowler-Nordheim plot for the pillar projections of FIG. 10.

The emission measurements and the corresponding Fowler-Nordheim plots are shown in FIGS. 11-13. Each structure was tested repeatedly at a minimum of ten sweeps, in conditions ranging from where the electric field was ramped in a low duty cycle short duration pulse (0.2 msec at 1 Hz) to a continuous dc ramp over ten minutes. In these and all other tested devices, the emission characteristics did not vary or deteriorate as long as the emission was kept below a critical value dependent on the specific geometry of the structure, further described below. In FIG. 11, the baseline emission of the 2D mesa structure is shown. FIGS. 12 and 13 demonstrate increased emission through spatial arrangement of the emitter arrays, with increasing β through reduced dimensionality, and the extracted values for β are shown in Table 1. The emitter array in FIG. 13 yielded stable emission in excess of 6 A/cm$^2$ at an applied macroscopic electric field of 7.5 V/μm. This value is comparable to emission values typically achieved using thermal sources, which are capable of emission in the range of 1 A/cm$^2$ to 10 A/cm$^2$.

Figure 14:
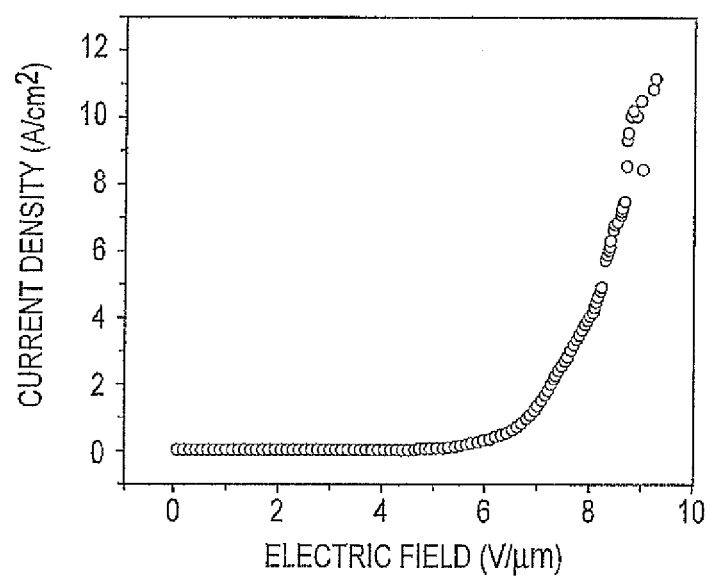
FIG. 14 is a graph of current density versus electric field for the pillar projections of FIG. 10, taken to failure.

In all of the structures tested, there is a critical emission current density above which the emission fluctuates and in no longer stable. Typically the onset of instability occurs at half the maximum values where catastrophic failure occurs and the structure no longer has significant emission. This is shown in FIG. 14, where the pillar structure in FIG. 10 was tested to failure. Here, the emission instability above 6 A/cm$^2$ is apparent, and at a current density of 11 A/cm$^2$ at 9.0 V/μm, the device failed catastrophically. For emitters tested to failure, post-examinations through electron microscopy show melting of the structure at the emission points, and indicate local heating exceeded the thermal limits of the material.

Figure 16:
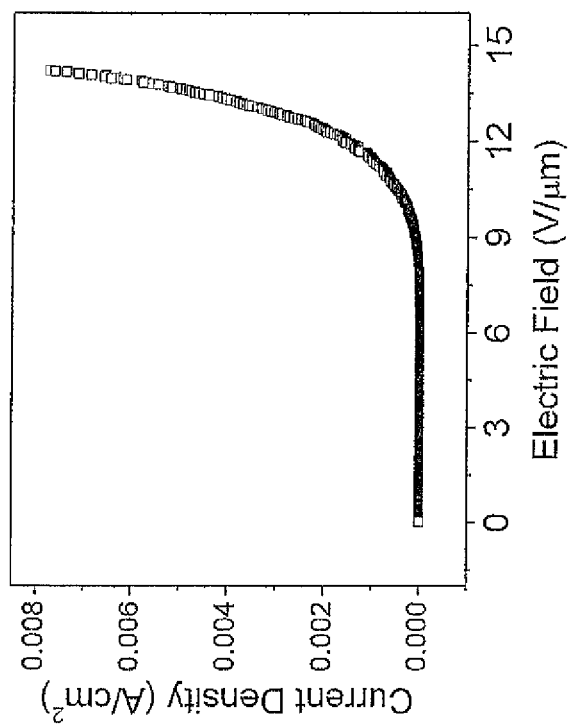
FIG. 16 is a graph of current density versus electric field for the emitter shown in FIG. 15.
Figure 15:
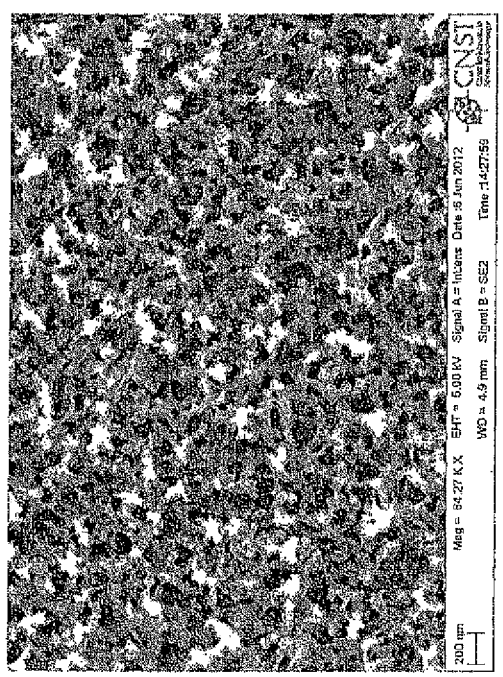
FIG. 15 is a planar view of a SEM image of an electrochemically etched "Si-face" of silicon carbide substrate formed using Condition 2.

FIG. 15 is a planar view of a SEM image of an electrochemically etched Si-face of a silicon carbide substrate formed using the Condition 2 conditions. FIG. 16 is a graph of current density versus electric field for the emitter shown in FIG. 15.

In addition to high emission, reliability is critical and significantly influenced the approach taken in this effort. As the structures are monolithic, there are no interfaces that may be potential failure points. In addition, the porous morphology leads to a continuous supply of emission points as the surface wears.

In summary, a new form of field emitter is provided which demonstrates emission at levels comparable to thermal sources, comprised of monolithic nanostructured silicon carbide. Emission properties are tuned through control of field enhancement at a two-level hierarchy set by the local and global scale. It is believed that performance may be further enhanced through optimization of electrochemistry conditions and geometric design, and lead to high emission consistent with a specified operating field, and remain below the material's inherent limitations. The ease of fabrication and the performance demonstrated herein provides indications of wide use in a variety of applications.

Many other benefits will no doubt become apparent from future application and development of this technology.

All patents, applications, and articles noted herein are hereby incorporated by reference in their entirety.

As described hereinabove, the present subject matter overcomes many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A field emitter having a plurality of discrete emission projections extending from an emission face of the field emitter, the field emitter being monolithic and homogenous in a direction transverse to the emission face of the field emitter, wherein the emitter achieves an emission current density greater than 1 A/cm$^2$ at an applied macroscopic electric field of 3 V/μm.

2. A field emitter having a plurality of discrete emission projections extending from an emission face of the field emitter, the field emitter being monolithic and homogenous in a direction transverse to the emission face of the field emitter, wherein the emitter achieves an emission current density greater than 6 A/cm$^2$ at an applied macroscopic electric field of 7.5 V/μm.

3. A field emitter having a plurality of discrete emission projections extending from an emission face of the field emitter, the field emitter being monolithic and homogenous in a direction transverse to the emission face of the field emitter, wherein the emitter achieves an emission current density of up to 11 A/cm$^2$ at an applied macroscopic electric field of 9.0 V/μm, without failure.

4. A cold cathode silicon carbide field emitter defining an emission face having a plurality of discrete emission projections, the field emitter achieving an emission current density greater than 6A/cm$^2$ at an applied macroscopic electric field of 7.5 V/μm.

5. The field emitter of claim 4 wherein the field emitter is monolithic and homogenous in a direction transverse to the emission face of the field emitter.

6. The field emitter of claim 4 wherein the field emitter is nanoporous along the emission face.

* * * * *